United States Patent
Liao et al.

(10) Patent No.: US 11,764,944 B2
(45) Date of Patent: Sep. 19, 2023

(54) FIELD-PROGRAMMABLE GATE ARRAY (FPGA) CLUSTERS AND METHODS OF USING AN FPGA CLUSTER FOR HOMOMORPHIC ENCRYPTION ACCELERATION

(71) Applicant: HUAWEI TECHNOLOGIES CO., LTD., Guangdong (CN)

(72) Inventors: Haohao Liao, Waterloo (CA); Zhiwei Shang, Waterloo (CA); Yin Tan, Waterloo (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 135 days.

(21) Appl. No.: 17/566,337

(22) Filed: Dec. 30, 2021

(65) Prior Publication Data
US 2023/0216655 A1  Jul. 6, 2023

(51) Int. Cl.
*H04L 9/00* (2022.01)
(52) U.S. Cl.
CPC ........ *H04L 9/008* (2013.01); *H04L 2209/125* (2013.01)
(58) Field of Classification Search
CPC ................... H04L 9/008; H04L 2209/125
See application file for complete search history.

(56) References Cited

U.S. PATENT DOCUMENTS

| | | | |
|---|---|---|---|
| 11,256,431 B1* | 2/2022 | Ben-Yehuda | G06F 3/0608 |
| 2018/0375640 A1* | 12/2018 | Laine | H04L 9/008 |
| 2022/0229634 A1* | 7/2022 | Hein | G06E 1/065 |
| 2022/0255721 A1* | 8/2022 | Ren | G06F 9/5027 |

OTHER PUBLICATIONS

Accelerating Somewhat Homomorphic Evaluation using FPGAs, by Savas et al., published 201.5 (Year: 2015).*
FPGA-based High-Performance Parallel Architecture for Homomorphic Computing on Encrypted Data, by Turan et al., published 2015 (Year: 2019).*

* cited by examiner

Primary Examiner — Vu V Tran
(74) Attorney, Agent, or Firm — Locke Lord LLP; Tim Tingkang Xia, Esq.

(57) ABSTRACT

A field-programmable gate array (FPGA) cluster, comprising a plurality of FPGA devices, can be used to accelerate homomorphic encryption functionality. In particular, the FPGA cluster can accelerate the relinearization process used in homomorphic encryption by using multiple FPGA devices to perform portions of the relinearization process in parallel. Further, the use of the FPGA cluster provides sufficient memory resources to allow data used by the relinearization process, namely the keyswitch keys, to be stored on-chip.

20 Claims, 6 Drawing Sheets

FIELD-PROGRAMMABLE GATE ARRAY (FPGA) CLUSTERS AND METHODS OF USING AN FPGA CLUSTER FOR HOMOMORPHIC ENCRYPTION ACCELERATION

TECHNICAL FIELD

The current disclosure relates to homomorphic encryption and in particular to the acceleration of homomorphic encryption with Field-programmable gate array (FPGA) devices.

BACKGROUND

Homomorphic Encryption (HE), or fully homomorphic encryption (FHE) allows arbitrary computation on encrypted data which enables privacy preserving computation. However, the large computation overhead leads to a significantly slow speed for the homomorphic encryption.

Homomorphic encryption can be accelerated using specific hardware implemented using a field-programmable gate array (FPGA). A state of the art FPGA-based hardware accelerator is provided by HEAX (Homomorphic Encryption Acceleration). HEAX provides an implementation of the Cheon-Kim-Kim-Song (CKKS) relinearization operation on a single FPGA. The CKKS relinearization operation is used in homomorphic encryption.

While existing techniques have accelerated homomorphic encryption, the process remains relatively slow and would benefit from additional, alternative, and/or improved acceleration techniques.

SUMMARY

In accordance with the present disclosure, there is disclosed field-programmable gate array (FPGA) cluster for use in a relinearization pipeline for homomorphic encryption (HE), the FPGA cluster comprising: a first-level FPGA providing: input functionality for receiving ciphertext polynomial vector comprising R Residual Number System (RNS) components of a polynomial; inverse number-theoretic transform (INTT) functionality; a first communication interface for communicating with a computing device; and an FPGA communication interface for communicating with other FPGAs; a plurality of second-level FPGAs each in communication with the first-level FPGA capable of operating in parallel and providing: number-theoretic transform (NTT) functionality; and an FPGA communication interface for communicating with other FPGAs; a plurality of third-level FPGAs in communication with the plurality of second-level FPGAs, each capable of operating in parallel and providing: multiplication (MUL) functionality; and an FPGA communication interface for communicating with other FPGAs; and a fourth-level FPGA in communication with each of the plurality of third-level FPGAs and providing: residue number system (RNS) Floor functionality; output functionality a first communication interface for communicating with the computing device; and an FPGA communication interface for communicating with other FPGAs, wherein: the FPGA communication interface of the first-level FPGA is used for communicating with the FPGAs of the plurality of second-level FPGAs, the FPGA communication interface of each of the plurality of second-level FPGAs is used for communicating with the first-level FPGA and one or more of the plurality of third-level FPGAs, the FPGA communication interface of each of the plurality of third-level FPGAs is used for communicating with one or more of the plurality of second-level FPGAs and the fourth-level FPGA.

In a further embodiment of the FPGA cluster, the INTT functionality of the first-level FPGA comprises R parallel INTT modules each providing INTT functionality, where R is a number of RNS components of an input polynomial.

In a further embodiment of the FPGA cluster, each of the INTT modules of the first-level FPGA comprises a single INTT core for performing the INTT.

In a further embodiment of the FPGA cluster, the NTT functionality provided by the plurality of second-level FPGAs comprises nR NTT modules, where n is a positive integer, each providing NTT functionality.

In a further embodiment of the FPGA cluster, each of the NTT modules comprises a plurality of NTT cores.

In a further embodiment of the FPGA cluster, the MUL functionality provided by the plurality of third-level FPGAs comprises nR MUL modules, where n is a positive integer, each providing MUL functionality.

In a further embodiment of the FPGA cluster, each of the nR MUL modules comprises a plurality of MUL cores.

In a further embodiment of the FPGA cluster, the RNS Floor functionality provided by the fourth-level FPGA comprises a single FPGA providing the RNS Floor functionality.

In a further embodiment of the FPGA cluster, the RNS floor functionality comprises: INTT functionality; NTT functionality; modular subtraction; and modular multiplication functionality.

In a further embodiment of the FPGA cluster, the first-level FPGA receives an input polynomial in NTT form from the computing device over the first communication interface.

In a further embodiment of the FPGA cluster, the fourth-level FPGA outputs a constant-term polynomial and a linear term polynomial.

In a further embodiment of the FPGA cluster, the first communication interface of the first-level FPGA and the first communication interface of the fourth-level FPGA comprise a Peripheral Component Interconnect Express (PCIe) interface.

In a further embodiment of the FPGA cluster, the first communication interface of the first-level FPGA uses half the bandwidth of the first communication interface of the fourth-level FPGA.

In a further embodiment of the FPGA cluster, the FPGA communication interface of one or more of the plurality of second-level FPGAs and the FPGA communication interface of one or more of the plurality of third-level FPGAs comprises an AURORA® protocol-based interface (AURORA is a registered trademark of Xilinx Inc., San Jose, CA, USA).

In a further embodiment of the FPGA cluster, the AURORA® protocol uses 64b/66b encoding.

In accordance with the present disclosure, there is further provided a method for relinearization of a polynomial, the method comprising: receiving, at a Field-programmable gate array (FPGA) cluster comprising a plurality of FPGAs operating in parallel, a ciphertext polynomial vector comprising R Residual Number System (RNS) components of a polynomial; performing a relinearization on the received ciphertext polynomial vector using the plurality of FPGAs operating in parallel to generate a constant-term polynomial vector having R components and a linear-term polynomial vector having R components; outputting the constant-term polynomial vector and the linear-term polynomial vector.

In a further embodiment of the method, performing the relinearization comprises: receiving, at a first-level FPGA of the FPGA cluster, the ciphertext polynomial vector and transforming each of the RNS components into an inverse number-theoretical transform (INTT) domain; at the first-level FPGA, expanding the ciphertext polynomial vector to a ciphertext polynomial matrix by performing modular reduction using R+1 moduli on each of the INTT domain RNS components of the ciphertext polynomial vector; at a plurality of second-level FPGAs of the FPGA cluster, transforming, in parallel, polynomials of the ciphertext polynomial matrix from the INTT domain to the NTT domain; at a plurality of third-level FPGAs of the FPGA cluster multiplying, in parallel, the ciphertext matrix in the NTT domain by a first keyswitch matrix to generate a constant-term matrix and the ciphertext matrix in the NTT domain by a second keyswitch matrix to generate a linear term matrix; performing modular addition for each element in a row of the constant-term matrix to generate a constant-term summation column vector; and performing modular addition for each element in a row of the linear-term matrix to generate a linear-term summation column vector; and at a fourth-level FPGA of the FPGA cluster, performing an RNS floor operation using each of the constant-term summation column vector and the linear-term summation column vector to generate the constant-term polynomial vector and the linear-term polynomial vector.

In a further embodiment of the method, performing the RNS floor operation comprises: transforming a last element of the constant-term summation column vector and a last element of the linear-term summation column vector to the INTT domain; performing a modular reduction on the last element of the constant-term summation column vector to generate a reduced constant-term column vector and performing a modular reduction on the last element of the linear-term summation column vector to generate a reduced linear-term column vector; transforming the reduced constant-term column vector and the reduced linear-term column vector to the NTT domain; performing a modular subtraction between the constant-term summation column vector and the reduced constant-term column vector and multiplying the result by an inverse of the moduli; and performing a modular subtraction between the linear-term summation column vector and the reduced linear-term column vector and multiplying the result by an inverse of the moduli.

In a further embodiment of the method: the first-level FPGA communicates with each of the second-level FPGAs using an inter-FPGA communication protocol; each of the second-level FPGAs communicate with one or more of the plurality of third-level FPGAs using the inter-FPGA communication protocol; and each of the third-level FPGAs communicate with the fourth-level FPGA using the inter-FPGA communication protocol.

In a further embodiment of the method, the ciphertext polynomial vector is received from a computing device over a PCIe interface and wherein the constant-term polynomial vector and the linear-term polynomial vector are output to the computing device over the PCIe interface.

Portions of homomorphic encryption algorithms can be accelerated using FPGA-based hardware. An FPGA cluster of a plurality of FPGAs can provide hardware-based acceleration of homomorphic encryption algorithms. The FPGA cluster may include FPGA devices that process portions of the homomorphic encryption in parallel.

BRIEF DESCRIPTION OF THE DRAWINGS

Further features and advantages of the present disclosure will become apparent from the following detailed description, taken in combination with the appended drawings, in which.

DETAILED DESCRIPTION

Accelerating an algorithm may be achieved in various ways, including by providing specialized hardware capable of performing the algorithm, or a portion of the algorithm. The specialized hardware may be implemented using field-programmable gate arrays (FPGAs) or Application Specific Integrated Circuits (ASIC). An FPGA allows the specialized hardware to be programmed to carry out the desired functionality, whereas an ASIC is specifically designed circuit that carries out the desired functionality. Implementation using an FPGA may be generally easier than the use of an ASIC as the deep sub-micron verification of the FPGA has been done by the Vendor, such as XILINX® (XILINX is a registered trademark of Xilinx Inc., San Jose, CA, USA) or INTEL® (INTEL is a registered trademark of Intel Corp., Santa Clara, CA, USA) and also does not need to wait for prototype. While FPGAs may be simpler to implement compared to an ASIC they can impose resource constraints on the hardware as the FPGA is limited in the available hardware, such as memory or on chip RAM, DSP (digital signal process). In contrast, an ASIC can be designed to meet more aggressive resource requirements; however designing, testing and manufacturing the hardware can be time consuming and costly.

The current state of the art FPGA-based acceleration of HEAX uses a single FPGA to implement a homomorphic multiplication (HE_MULT) operation, which includes a relinearization process. The single FPGA offloads a keyswitch key used in the relinearization to DRAM as the FPGA does not have sufficient on chip memory to store the keyswitch key as well as perform the HE_MULT operation.

The HEAX hardware acceleration has limited hardware resources and the design for the relinearization operation consumes a large amount of DSP/RAM. On a single FPGA, the on chip DSP/RAM resource is limited. Hence, the operations might not be processed simultaneously. For example, due to resource limitations the FPGA may not be able to perform multiple Number-Theoretic Transform (NTT) operations or multiple MUL functionality simultaneously. Further, the keyswitch key may comprise a large number of polynomials and may need to be stored on off-chip memory due to limited on chip memory resources of the FPGA, such as when the ciphertext polynomial is degree N and the ciphertext polynomial coefficient bit width q is large. Access to the off-chip memory is relatively slow.

The single FPGA acceleration of HEAX may not scale well due to resource limitations and may only support homomorphic encryption using small parameters.

The current disclosure uses a cluster of a plurality of FPGAs to accelerate homomorphic encryption. The particular FPGA cluster described in the current application can accelerate the homomorphic encryption process by breaking the homomorphic encryption into different processes that can be processed in parallel using separate FPGA devices. The hardware acceleration described herein uses an FPGA cluster of a plurality of FPGA devices to increase the available resources and support higher throughput as well as a larger parameter set.

Figure 1:
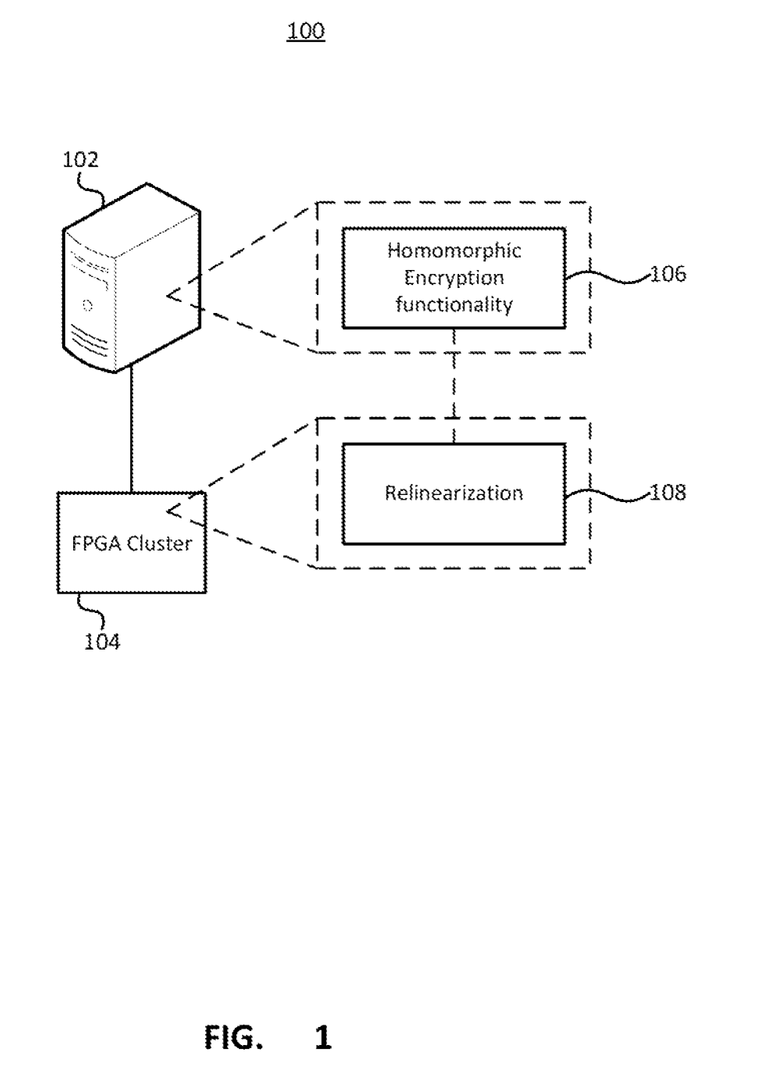
FIG. 1 is a schematic diagram depicting a system for accelerating homomorphic encryption.

FIG. 1 depicts a system for accelerating homomorphic encryption. The system 100 comprises a computer device 102 and an FPGA cluster 104. The computer device 102 comprises at least one processor capable of executing instructions which may be stored in a memory. When the at least one processor executes the instructions, the computing device is configured to provide various functionality including homomorphic encryption functionality 106. It will be appreciated that only the functionality of the homomorphic encryption 106 is depicted in FIG. 1, however the computing device 102 will include additional functionality that can incorporate the homomorphic encryption into various different applications. While the computing device 102 provides homomorphic encryption functionality 106, the functionality makes use of the FPGA cluster 104 in order to accelerate portions of the homomorphic encryption process. As depicted, the FPGA cluster 104 may provide a hardware-based relinearization process 108. The FPGA cluster 104 comprises a plurality of individual FPGA devices that are arranged to perform certain operations of the relinearization process in parallel. Although the FPGA cluster uses a plurality of FPGA devices operating in parallel, the FPGA cluster may also include FPGA devices that do not operate in parallel with other FPGA devices. An example FPGA cluster is described in further detail below, however the cluster may communicate with the computing device using a variety of communication interfaces, including for example a peripheral component interconnect express (PCIe) interface.

Figure 2:
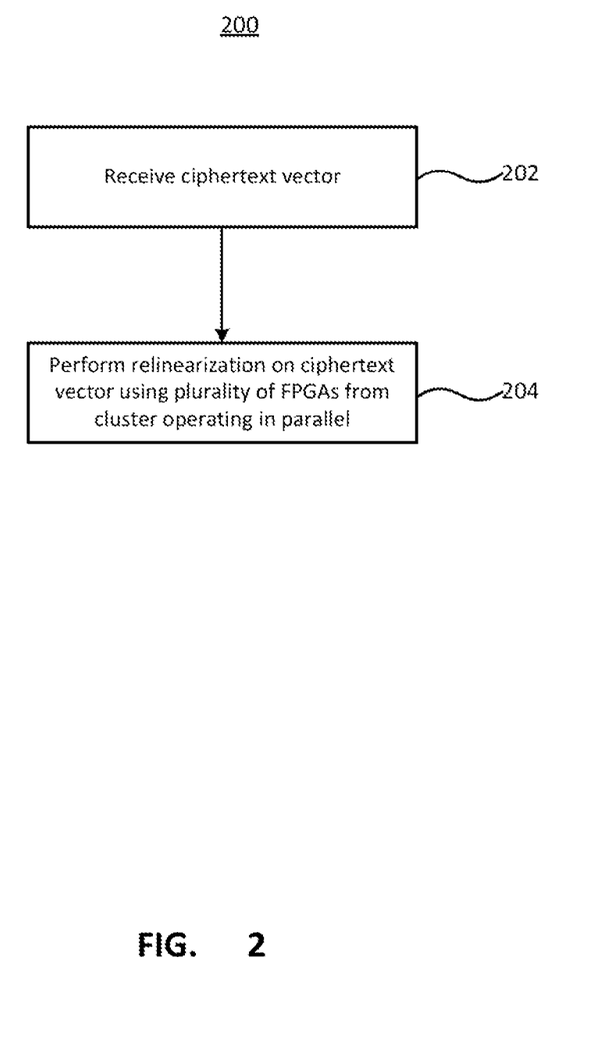
FIG. 2 is a flowchart depicting a method for accelerating homomorphic encryption.

FIG. 2 depicts a method for accelerating homomorphic encryption. The method 200 receives a ciphertext vector (202) and then performs relinearization on the ciphertext vector using a plurality of FPGAs of the cluster operating in parallel (204). As described further below, the relinearization process may be broken up and portions of the process performed on multiple FPGAs in parallel. The combined resources of all of the FPGAs in the FPGA cluster may allow the acceleration of encryption even with a medium to large parameter setting, such as a ciphertext polynomial N>=8192 and ciphertext polynomial coefficient q>=200 bit. The acceleration of the encryption using an FPGA cluster is described further below with reference to the CKKS homomorphic encryption process.

The CKKS encryption algorithm uses a relinearization process, which can be beneficially implemented by the current FPGA cluster. The relinearization process comprises a keyswitch process followed by a residual number system (RNS) floor process. The relinearization process receive as input a vector of ciphertext $C_i$, where $i \in [0, R-1]$, each $C_i$ is a polynomial of degree N−1 and the coefficient bit width is $q_i$. R is the number of RNS components. The relinearization process multiplies the input vector, or a matrix representation of the input vector, by a pair of keyswitch key matrices to generate a constant term and linear term for the ciphertext.

The structure of both keyswitch keys is the same. Each key is represented as a matrix shown below in Table 1, where $K_{i,j}$ is a polynomial and i,j represents the RNS component i and moduli $P_j$. $i \in [0, R-1]$ and $j \in [0, R]$

TABLE 1

| The keyswitch key structure | | | |
|---|---|---|---|
| K0, 0 | K1, 0 | ... | KR − 1, 0 |
| K1, 0 | K1, 1 | ... | K1, R − 1 |
| ... | ... | ... | ... |
| KR, 0 | KR, 1 | ... | KR, R − 1 |

Since the keyswitch key is the same structure for both sets of key, only one is shown and the keyswitch process described with regard to the single keyswitch key. It will be appreciated that the same process is applied to the second keyswitch key. The output of the relinearization is two terms representing the ciphertext, namely a constant term $Const_i$ where $i \in [0, R-1]$, and a linear term $Linear_i$ where $i \in [0, R-1]$.

In calculating the constant and linear terms, the input ciphertext vector is expanded to a matrix by doing modular reduction using the moduli $P_j$. The ciphertext matrix is depicted in Table 2.

TABLE 2

| The ciphertext matrix structure | | | |
|---|---|---|---|
| C0, 0 | C1, 0 | ... | CR − 1, 0 |
| C1, 0 | C1, 1 | ... | C1, R − 1 |
| ... | ... | ... | ... |
| CR, 0 | CR, 1 | ... | CR, R − 1 |

The ciphertext matrix is updated, or a further matrix generated, by performing a pair-wise multiplication between the ciphertext matrix and the keyswitch key matrix using the formula: $C_{i,j} = C_{i,j} * K_{i,j} \mod P_j$. Modular addition is performed for each element in a row as $Sum_j = \Sigma_{i=0}^{R-1} Ci,j$. After the modular addition, a single column vector is generated as shown in Table 3.

TABLE 3

| Column vector for the result after modular addition for each row |
|---|
| Sum0 |
| Sum1 |
| ... |
| SumR − 1 |
| SumR |

Modular reduction is performed on the last element of the column vector $Sum_R$ using moduli $P_j$ to generate a corresponding vector according to $Sum_{R,j} = Sum_R \mod P_j$, $j \in [0, R-1]$. The constant term may then be generated using the column vector and summation vector according to $Const_j = (Sum_j - Sum_{R,j}) * P_R^{-1} \mod P_j$. The linear term is generated in the same manner, but using a different keyswitch key.

Further, in order to perform the modular reduction operations, the polynomials must be transformed to the Inverse Number Theoretic Transform (INTT) domain. For polynomial multiplication, the polynomial is transformed to the Number Theoretic Transform (NTT) domain to reduce the complexity of the multiplication.

As described above, the ciphertext is expanded from a vector of polynomials to a matrix of polynomials. Due to limited resources in hardware, in some cases such as acceleration using a single FPGA, this whole matrix cannot be proceeded simultaneously inside the hardware. The most direct approach of improving the performance is to deal with more data at the same time. Hence, for the ciphertext polynomial matrix, if the hardware is capable of processing the whole matrix at the same time, the performance could be massively enhanced. However, even the most powerful FPGA chips currently available cannot process the whole matrix simultaneously with a medium- to large-parameter setting such as for ciphertext polynomial N>=8192 and ciphertext polynomial coefficient q>=200 bit. The FPGA cluster may be used to accelerate the processing using multiple FPGA chips. Although the FPGA cluster is described with particular reference to the CKKS relinearization process, a similar FPGA cluster could be used to accelerate other homomorphic encryption algorithm such as BGV (Brakerski, Gentry and Vaikuntanathan)/BFV (Brakerski, Fan, and Vercauteren).

Figure 3:
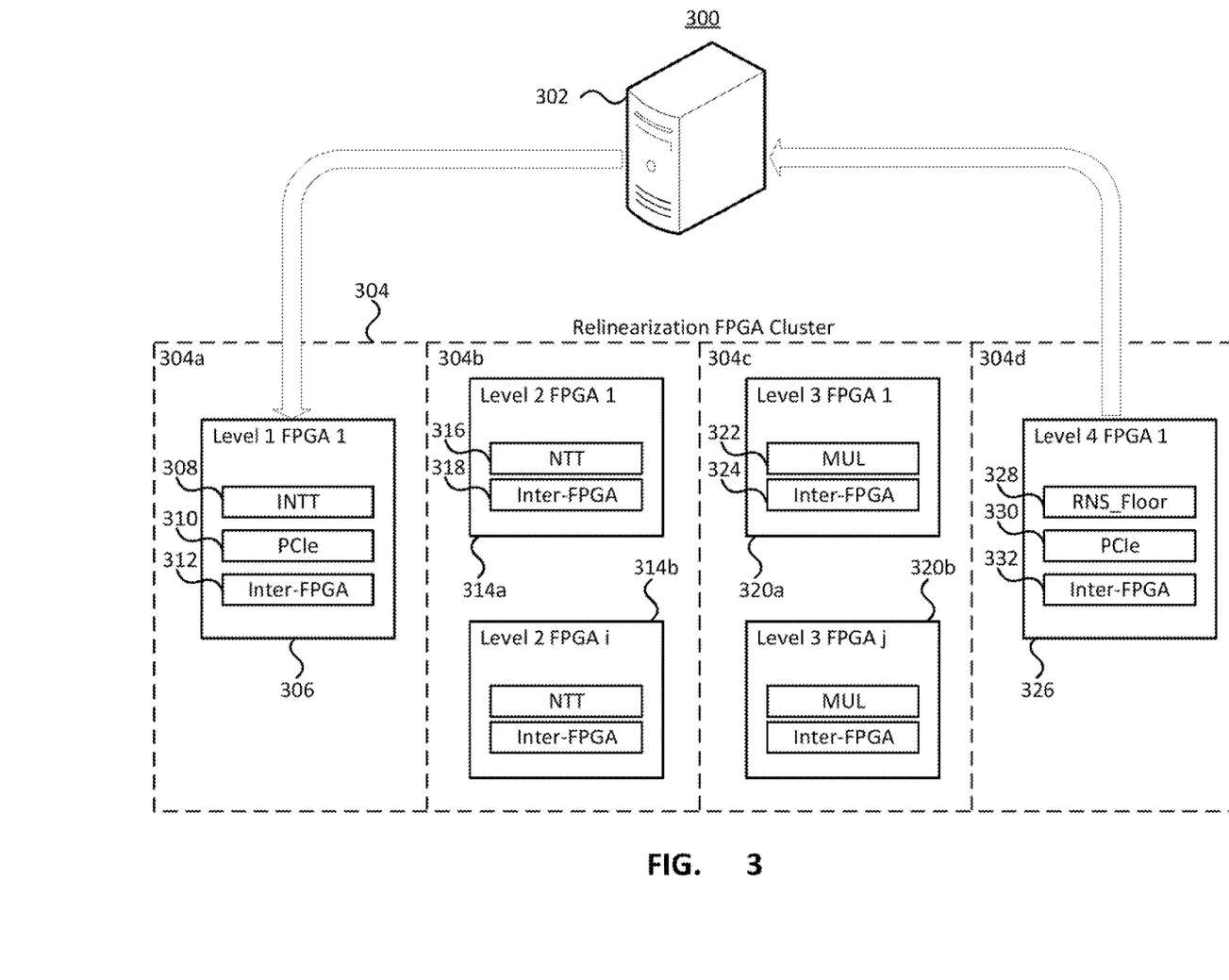
FIG. 3 is a schematic diagram depicting details of an FPGA cluster for use in accelerating homomorphic encryption.

FIG. 3 depicts details of an FPGA cluster for use in accelerating homomorphic encryption. The system 300 comprises a computing device 302 that is in communication, for example using a PCIe interface, with an FPGA cluster 304, which is used to accelerate the relinearization process for the computing device. The FPGA cluster 304 comprises a plurality of different levels 304a, 304b, 304c, 304d that are each responsible for different portions of the relinearization process. Each of the levels in the FPGA cluster comprise at least one FPGA device, while some of the levels such as level 2 304b and level 3 304c each comprise a plurality of FPGA devices that operate in parallel.

Some levels may comprise 0 FPGA devices based on different performance requirement. For example the FPGA cluster may comprises a first FPGA that performs the keyswitch operation and second FPGA that performs the RNS Floor operation The first level 304a of the FPGA cluster acts as an input layer that receives the ciphertext vector from the computing device 302. The first level of the FPGA cluster may be provided by a single FPGA device 306 that is configured to provide INTT functionality 308 that can transform a polynomial from the NTT domain to the INTT domain. The INTT functionality of the first-level FPGA may comprise one or more INTT modules, each with one or more INTT processing cores. For example, the INTT functionality may comprise R INTT modules each with a single core, where R is the number of RNS components of the input polynomial. The FPGA 306 further includes a communication interface, depicted as a PCIe interface, 310 for communicating with the computing device 302. In addition to the PCIe interface 310, the FPGA 306 also includes a high-speed inter-FPGA communication interface 312 for communicating with other FPGAs in the cluster, and in particular the FPGAs of the second level 304b. The inter-FPGA communication interface may be provided by, for example a protocol such as AURORA® that uses 64b/66b encoding and can support communication speeds up to 400 Gbps. Using multiple AURORA® instances could further improve the inter-FPGA communication to 1600 Gbps.

The second-level 304b of the FPGA cluster comprises a plurality of FPGA devices 314a, 314b. Although only two FPGAs are depicted in FIG. 3, additional FPGAs may be included in the second level. Each of the FPGAs of the level 304b have substantially the same functionality and includes NTT functionality 316 that transforms a polynomial from the INTT domain to the NTT domain. The NTT functionality provided by the plurality of level 2 FPGAs may comprise a plurality of NTT modules, such as nR NTT modules, where n is a positive integer such as 1, 2, 3, 4 and so on, each comprising a plurality of NTT cores. Each of the FPGAs 314a, 314b also includes inter-FPGA interfaces 318 for communicating with other FPGAs. The FPGAs of each level do not need to communicate with FPGAs within the same level but rather, in FPGAs of the previous and subsequent levels.

The third level 304c of the cluster comprises a plurality of FPGA devices 320a, 320b. Although only two FPGAs are depicted in FIG. 3, additional FPGAs may be included in the third level. Each of the FPGAs of the level 304c have substantially the same functionality and includes multiplication functionality 322 for performing polynomial multiplication under the NTT domain. The MUL functionality may comprise a plurality of MUL modules such as nR MUL modules, where nR MUL modules, where n is integer such as 1, 2, 3, 4 and so on, each with a plurality of MUL cores. Although not required, the number of MUL modules may be related to the number of NTT modules in the second level of the cluster. For example, if the second level of the FPGA cluster has 2R NTT modules, the second level could process 2 matrix slices in parallel. If the throughput of each MUL module is the same as the NTT module, the third level may have 4R MUL modules so that the third-level processing is completed in the same time as the second-level processing. If the number of cores per MUL module were doubled, and so the throughput doubled, the number of MUL modules could be reduced to 2R.

Each of the FPGAs may further include inter-FPGA interfaces 324 for communicating with other FPGAs. The FPGAs of each level do not need to communicate with FPGAs within the same level but rather in FPGAs of the previous and subsequent levels.

The fourth level 304d of the cluster comprises a single FPGA device 326 although multiple FPGAs could be used. The FPGA 326 of the fourth level 304d may act as an output layer and communicates the relinearization result, namely the constant term and the linear term with the computing device 302. Although a single FPGA device is depicted, multiple FPGA devices could be provided in the fourth level 304d, for example one for computing the constant term, and one for computing the linear term. The FPGA device 326 comprises RNS Floor functionality 328 for performing the RNS floor operation. The RNS floor functionality may be provided using a plurality of INTT cores, NTT cores, and MUL cores. The FPGA device further comprises a communication interface 330 depicted as a PCIe interface for communicating with the computing device 302 as well as inter-FPGA communicating interface 332 for communicating with other FPGAs, and in particular the FPGAs of the previous level. It will be appreciated that the output bandwidth of the FPGA cluster should be twice that of the input bandwidth. While the input is a single vector of polynomials, the output is two vectors of polynomials namely the constant-term polynomial and the linear-term polynomial.

It will be appreciated that not all of the functionality provided by FPGA devices is depicted in FIG. 3. Only those processes that require significant computational resources are depicted. For example, one or more of the FPGAs may include modular reduction functionality, modular addition functionality, modular subtraction functionality etc. However, since these processes do not consume substantial resources, they are omitted for clarity of the drawing.

Figure 4:
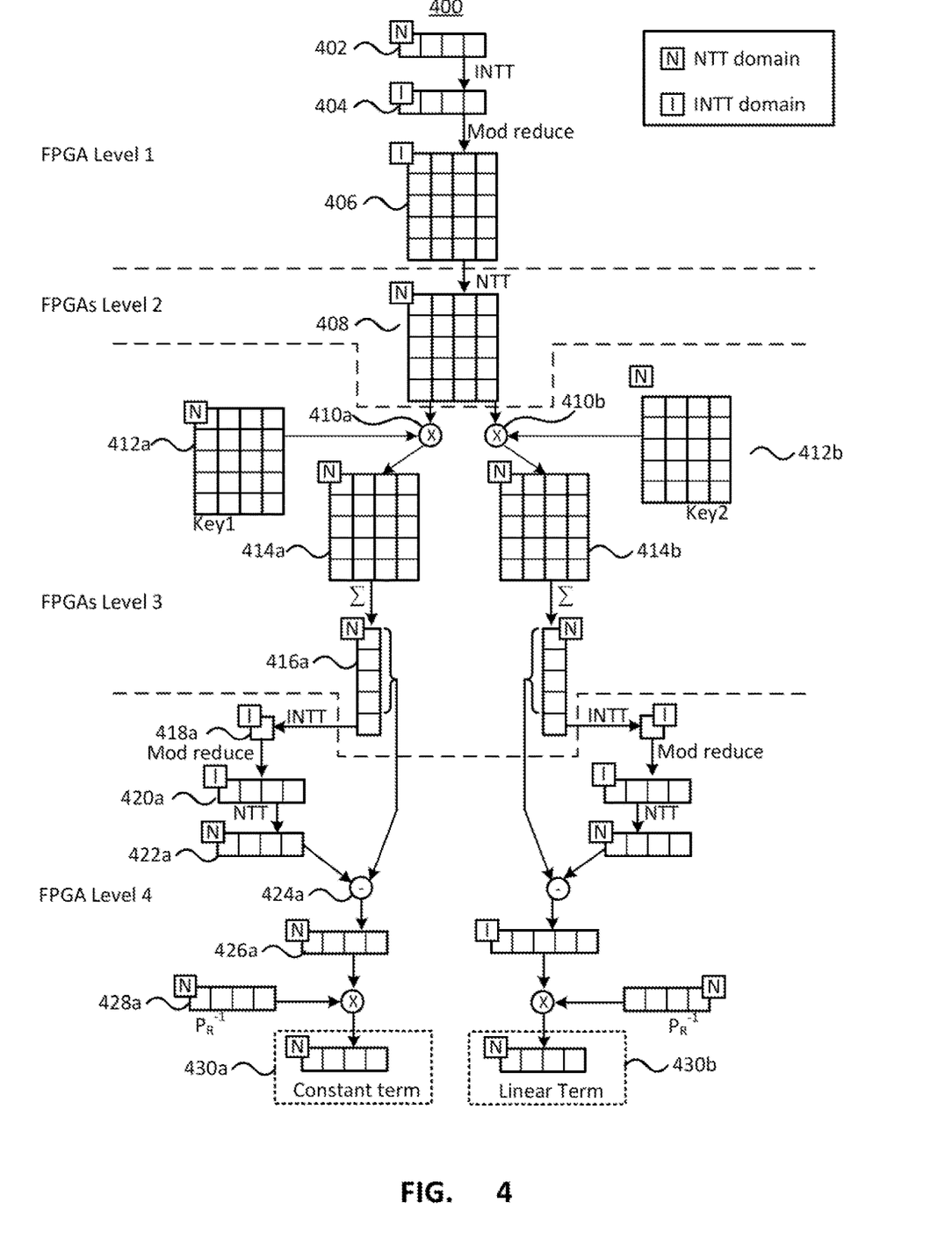
FIG. 4 is a schematic diagram depicting a process of accelerating homomorphic encryption using an FPGA cluster.

FIG. 4 depicts a process of accelerating homomorphic encryption using an FPGA cluster. The process 400 begins with receiving a polynomial vector 402 representing the ciphertext. The polynomial vector is in the NTT domain and is received at the first-level FPGA. The first-level FPGA transforms the vector to the INTT domain 404 and then performs a modular reduction on the polynomial vector to generate a polynomial matrix 406. The polynomial matrix 406 is passed to the FPGAs of the second level for processing in parallel. The matrix may be passed to the second-level FPGAs in various ways. For example, a first row of the matrix may be passed to a first FPGA of the second level, a second row of the matrix may be passed to a second FPGA of the second level and so on. It will be appreciated that the particular partitioning of the matrix may be varied. However, the FPGAs of the second level process the subsequent rows of the matrix 406 in parallel to transform the matrix from the INTT domain to the NTT domain 408. The FPGAs of the third level perform the pair-wise multiplication between the ciphertext matrix and key matrices by multiplying 410a, 410b of the matrix 408 by respective keys 412a, 412b. The multiplication generates two matrices 414a, 414b. The further processing is described with reference to only the first result matrix 414a, however the second result matrix 414b is processed in the same manner as depicted in FIG. 4. Processing of the first-result matrix 414a generates the constant term while processing the second-result matrix 414b generates the linear term. In addition to performing the modular multiplication, the third-level FPGAs also generate a summation column vector 416a by summing each of the elements of respective rows together.

The FPGA of the fourth level performs the RNS floor operation on the two-column vectors. As depicted for the first-column vector 416a, the last element of the vector is transformed to the INTT domain 418a in order to perform a modular reduction that generates an intermediate vector 420a which is then transformed back to the NTT domain 422a. The NTT-domain intermediate vector 420a is subtracted from the column vector with the last element removed. The subtraction result 424a is multiplied by an inverse moduli 428a to generate the constant term 430a. A similar processing of the second-column vector results in the linear term 430a. As depicted, both the constant term 430a and linear term 430b are in the NTT domain and can be returned to the computing device.

Figure 5:
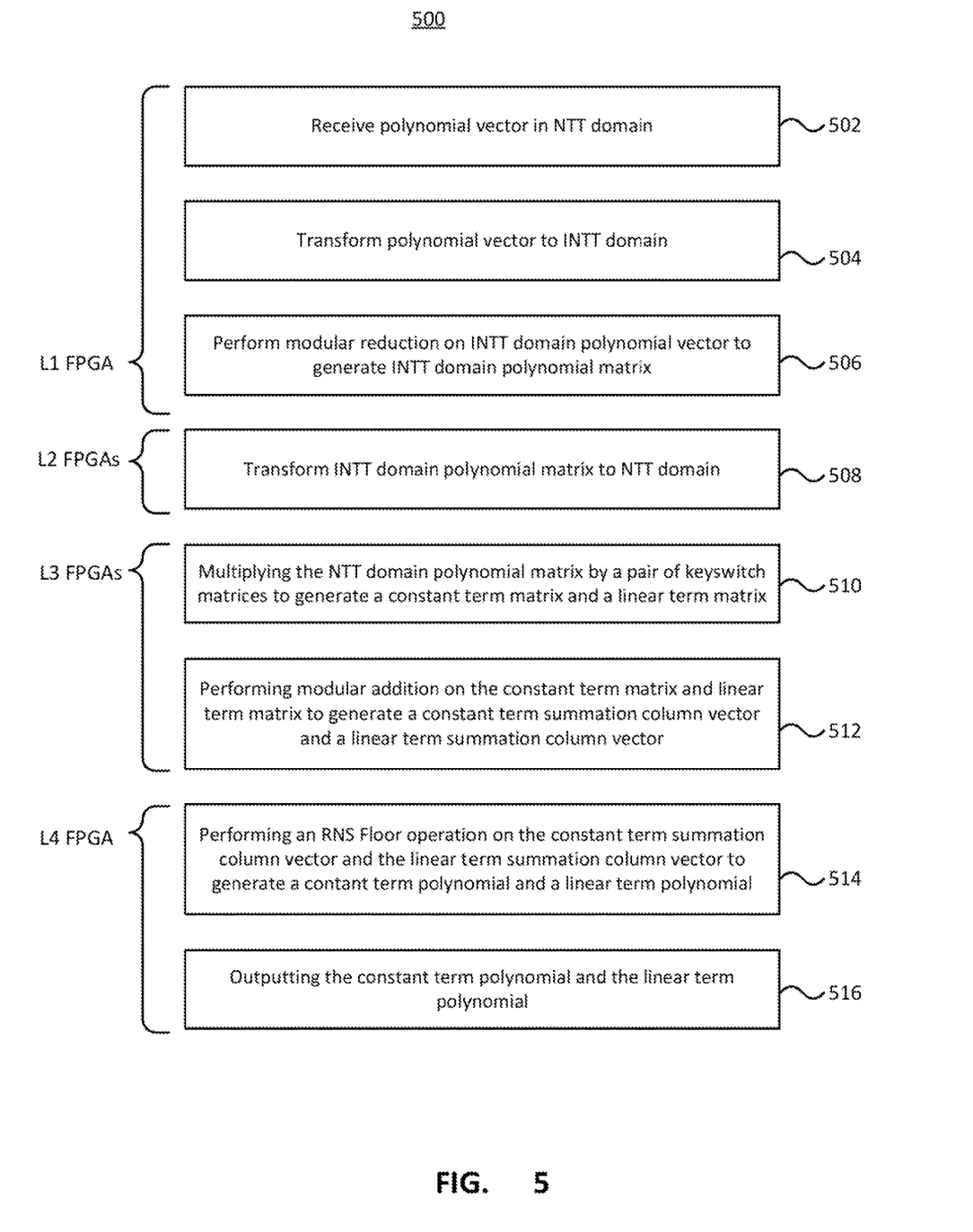
FIG. 5 is a schematic diagram depicting a further method for accelerating homomorphic encryption.

FIG. 5 depicts a further method for accelerating homomorphic encryption. The method 500 receives a polynomial vector representing a ciphertext in the NTT domain (502). The vector is received at a first-level FPGA of the FPGA cluster. The polynomial vector is transformed to the INTT (504) and performs a modular reduction on the INTT domain polynomial vector (506) to generate an INTT domain polynomial matrix. The INTT operation and the modular reduction are performed by the first-level FPGA. The polynomial matrix is transformed to the NTT domain (508) by a plurality of level 2 FPGAs of the FPGA cluster operating in parallel. The NTT domain polynomial matrix is multiplied by a pair of keyswitch matrices (510) to generate a constant-term matrix and a linear-term matrix. Modular addition is performed (512) on each of the matrices to sum the rows, resulting in respective column vectors. The matrix multiplication, and possibly the modular addition, may be performed using a plurality of level 3 FPGAs of the FPGA cluster. The modular addition is a computationally inexpensive process and may be performed in the level-3 FPGAs, or possibly in the level-4 FPGA. Once the column vectors are determined, the RNS floor operation is performed (514) on the column vectors to generate respective constant-term and linear-term vectors of polynomials which are then output (516) by the fourth-level FPGA. The RNS floor operation may include, for each of the column vectors, transforming the last element of the vector to the INTT domain and performing a modular reduction to generate an intermediate vector which is then transformed back to the NTT domain. The NTT-domain intermediate vector may then be subtracted from the other elements of the column vector, that is all of the column vector elements except for the last element. The vector resulting from the subtraction may then be multiplied by the inverse moduli to generate the constant and linear polynomial vectors which are output as the result of the relinearization process.

Figure 6:
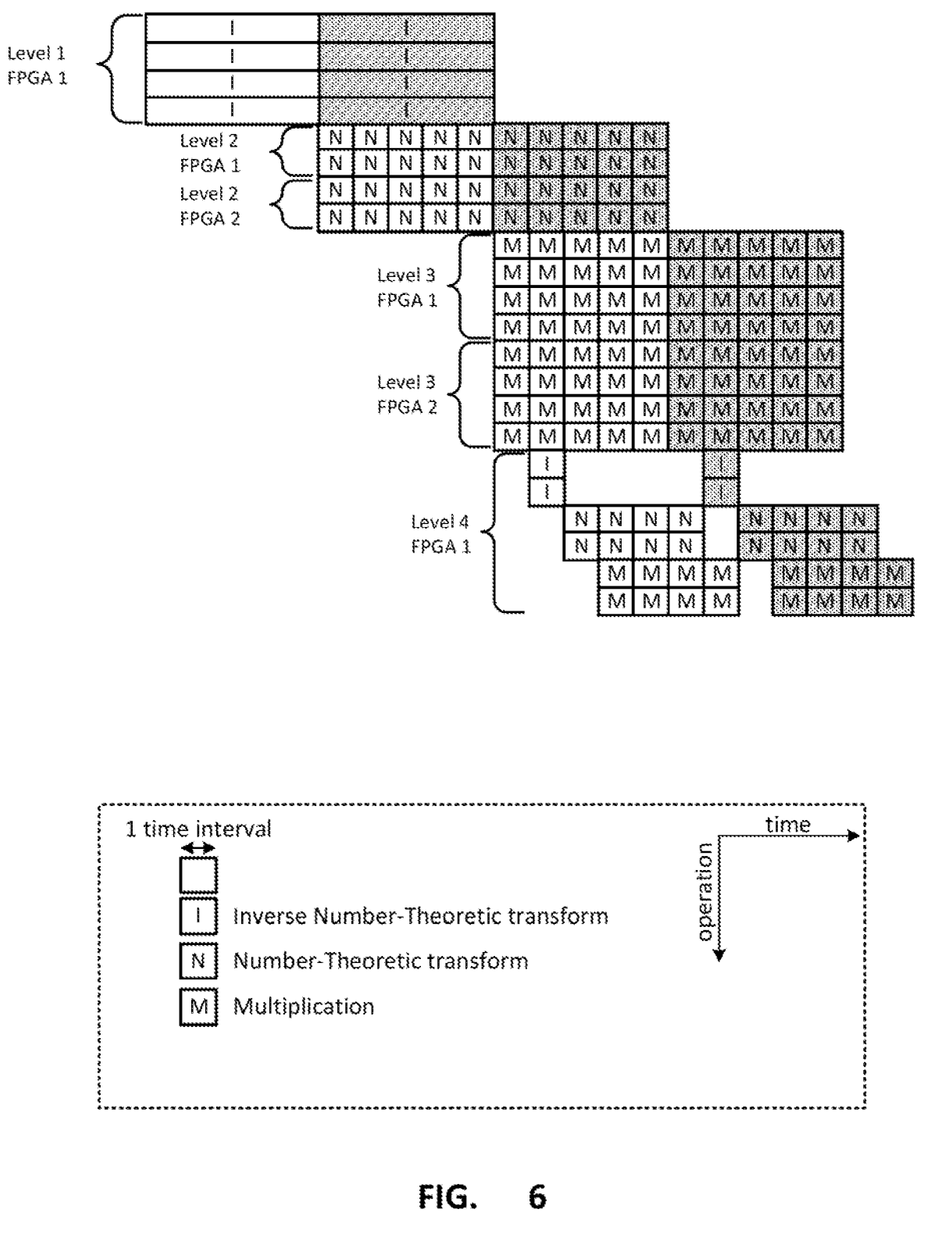
FIG. 6 is a schematic diagram depicting a performance of the relinearization using an FPGA cluster.

FIG. 6 depicts a high level pipeline of the relinearization using an FPGA cluster. The input to the whole FPGA cluster, or directly to Level 1, FPGA 1, is 4 RNS components of the ciphertext polynomials with N=32768, q=500 bits After RNS decomposition, the coefficient bit width is reduced to 125 bit for each RNS component. The original ciphertext polynomial can be reconstructed using Chinese Remainder Theorem. The first-level FPGA 1 receives these 4 RNS components and transforms them to the INTT domain. The input ciphertext polynomials are in NTT domain by default under the RNS decomposition and as such to perform the modular reduction as described in step 1 of the algorithm, the polynomials must be transformed to INTT domain. With the RNS components transformed to the INTT domain, modular reduction operations are performed on all the coefficients with 5 different moduli. Note that, the modular reduction operation is not shown in FIG. 6 because it doesn't consume any RAM or DSP resource. Moreover, the modular reduction for each coefficient can be done with a single pipeline stage, for example by using a one stage pipeline like a register.

Following the modular reduction operations, the polynomials are transformed back to the NTT domain since multiplication with the relinearization keys will be performed. Transformation to the NTT domain is performed by a plurality of FPGAs operating in parallel. The time it takes to perform the NTT operations is shorter compared to the initial INTT operation since more computation cores can be utilized as a result of the parallelization. After transforming the polynomials into NTT domain, the multiplication is performed between the ciphertext polynomial and the relinearization keys. The multiplication may be performed by a plurality of level 3 FPGAs operating in parallel. The modular addition of the matrix rows may also be performed by the level 3 FPGAs. Since modular addition does not consume RAM or DSP, it is not shown in FIG. 6. After the modular addition, the last element of the resulting column vector, $Sum_R$ is used to perform modular reduction over different moduli $P_j$. Hence, another INTT module is used to transform the polynomial for $Sum_R$ back to the INTT domain. The INTT domain transform and the subsequent modular reduction may be performed by the FPGA of the fourth level. The modular reduction is not shown in FIG. 6 since it takes only one clock cycle for the coefficients to perform modular reduction and it does not consume any RAM or DSP resource. The newly generated polynomials after the modular reduction will be transformed back to the NTT domain by using the NTT operations of the level 4 FPGA. After the NTT operation, a modular subtraction, which is not shown in FIG. 6, is performed between the newly generated polynomial and the polynomials received from the previous NTT operations. Finally, a modular multiplication is performed by multiplication functionality of the level 4 FPGA between the inverse of the moduli $P_R^{-1}$ and the polynomials and the results returned.

In the FPGA cluster design described above, the resources from the combined plurality of FPGAs is sufficient to support more parallel computing, which means the computation core of each module can be increased. Moreover, more parallel computing modules are also allowed. For example, it is possible to provide 4 NTT domain transformation operations in parallel. These changes help improve the performance and may be used to accelerate the process even with large parameter sets (N=32658, q=500 bit), which can provide more accuracy and multiplicative depth (<10 to 15). The FPGA cluster provides more RAM and DSP resources for the relinearization process allowing the computation time to be reduced as well as storing resources, such as the relinearization key matrices, on-chip and so avoid low speed off-chip memory access.

It will be appreciated by one of ordinary skill in the art that the system and components shown in FIGS. 1-6 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the present description.

Numerous additional variations on the methods and apparatus of the various embodiments described above will be apparent to those skilled in the art in view of the above description. Such variations are to be considered within the scope.

What is claimed is:

1. A field-programmable gate array (FPGA) cluster for use in a relinearization pipeline for homomorphic encryption (HE), the FPGA cluster comprising:
   a first-level FPGA providing:
      input functionality for receiving ciphertext polynomial vector comprising R Residual Number System (RNS) components of a polynomial;
      inverse number-theoretic transform (INTT) functionality;
      a first communication interface for communicating with a computing device; and
      an FPGA communication interface for communicating with other FPGAs;
   a plurality of second-level FPGAs each in communication with the first-level FPGA capable of operating in parallel and providing:
      number-theoretic transform (NTT) functionality; and
      an FPGA communication interface for communicating with other FPGAs;
   a plurality of third-level FPGAs in communication with the plurality of second-level FPGAs, each capable of operating in parallel and providing:
      multiplication (MUL) functionality; and
      an FPGA communication interface for communicating with other FPGAs; and
   a fourth-level FPGA in communication with each of the plurality of third-level FPGAs and providing:
      residue number system (RNS) Floor functionality;
      output functionality
      a first communication interface for communicating with the computing device; and
      an FPGA communication interface for communicating with other FPGAs,
   wherein:
      the FPGA communication interface of the first-level FPGA is used for communicating with the FPGAs of the plurality of second-level FPGAs,
      the FPGA communication interface of each of the plurality of second-level FPGAs is used for communicating with the first-level FPGA and one or more of the plurality of third-level FPGAs,
      the FPGA communication interface of each of the plurality of third-level FPGAs is used for communicating with one or more of the plurality of second-level FPGAs and the fourth-level FPGA.

2. The FPGA cluster of claim 1, wherein the INTT functionality of the first-level FPGA comprises R parallel INTT modules each providing INTT functionality, where R is a number of RNS components of an input polynomial.

3. The FPGA cluster of claim 2, wherein each of the INTT modules of the first-level FPGA comprises a single INTT core for performing the INTT.

4. The FPGA cluster of claim 1, wherein the NTT functionality provided by the plurality of second-level FPGAs comprises nR NTT modules, where n is a positive integer, each providing NTT functionality.

5. The FPGA cluster of claim 4, wherein each of the nR NTT modules, where n is a positive integer, comprise a plurality of NTT cores.

6. The FPGA cluster of claim 1, wherein the MUL functionality provided by the plurality of third-level FPGAs comprises nR MUL modules, where n is a positive integer, each providing MUL functionality.

7. The FPGA cluster of claim 4, wherein each of the nR MUL modules comprise a plurality of MUL cores.

8. The FPGA cluster of claim 1, wherein the RNS Floor functionality provided by the fourth-level FPGA comprises a single FPGA providing the RNS Floor functionality.

9. The FPGA cluster of claim 8, wherein the RNS floor functionality comprises:
   INTT functionality;
   NTT functionality;
   modular subtraction; and
   modular multiplication functionality.

10. The FPGA cluster of claim 1, wherein the first-level FPGA receives an input polynomial in NTT form from the computing device over the first communication interface.

11. The FPGA cluster of claim 1, wherein the fourth-level FPGA outputs a constant-term polynomial and a linear term polynomial.

12. The FPGA cluster of claim 1, wherein the first communication interface of the first-level FPGA and the first communication interface of the fourth-level FPGA comprise a Peripheral Component Interconnect Express (PCIe) interface.

13. The FPGA cluster of claim 12, wherein the first communication interface of the first-level FPGA uses half the bandwidth of the first communication interface of the fourth-level FPGA.

14. The FPGA cluster of claim 1, wherein the FPGA communication interface of one or more of the plurality of second-level FPGAs and the FPGA communication interface of one or more of the plurality of third-level FPGAs comprises an Aurora protocol-based interface.

15. The FPGA cluster of claim 3, wherein the Aurora protocol uses 64b/66b encoding.

16. A method for relinearization of a polynomial, the method comprising:
   receiving, at a Field-programmable gate array (FPGA) cluster comprising a plurality of FPGAs operating in parallel, a ciphertext polynomial vector comprising R Residual Number System (RNS) components of a polynomial;
   performing a relinearization on the received ciphertext polynomial vector using the plurality of FPGAs operating in parallel to generate a constant-term polynomial vector having R components and a linear-term polynomial vector having R components;
outputting the constant-term polynomial vector and the linear-term polynomial vector, wherein performing the relinearization comprises:
receiving, at a first-level FPGA of the FPGA cluster, the ciphertext polynomial vector and transforming each of the RNS components into an inverse number-theoretical transform (INTI) domain;
at the first-level FPGA, expanding the ciphertext polynomial vector to a ciphertext polynomial matrix by performing modular reduction using R+1 moduli on each of the INTT domain RNS components of the ciphertext polynomial vector;
at a plurality of second-level FPGAs of the FPGA cluster, transforming, in parallel, polynomials of the ciphertext polynomial matrix from the INTT domain to the NTT domain.

17. The method of claim 16, wherein performing the relinearization comprises:
at a plurality of third-level FPGAs of the FPGA cluster:
multiplying, in parallel, the ciphertext matrix in the NTT domain by a first keyswitch matrix to generate a constant-term matrix and the ciphertext matrix in the NTT domain by a second keyswitch matrix to generate a linear term matrix;
performing modular addition for each element in a row of the constant-term matrix to generate a constant-term summation column vector; and
performing modular addition for each element in a row of the linear-term matrix to generate a linear-term summation column vector; and
at a fourth-level FPGA of the FPGA cluster, performing an RNS floor operation using each of the constant-term summation column vector and the linear-term summation column vector to generate the constant-term polynomial vector and the linear-term polynomial vector.

18. The method of claim 17, wherein performing the RNS floor operation comprises:
transforming a last element of the constant-term summation column vector and a last element of the linear-term summation column vector to the INTT domain;
performing a modular reduction on the last element of the constant-term summation column vector to generate a reduced constant-term column vector and performing a modular reduction on the last element of the linear-term summation column vector to generate a reduced linear-term column vector;
transforming the reduced constant-term column vector and the reduced linear-term column vector to the NTT domain;
performing a modular subtraction between the constant-term summation column vector and the reduced constant-term column vector and multiplying the result by an inverse of the moduli; and
performing a modular subtraction between the linear-term summation column vector and the reduced linear-term column vector and multiplying the result by an inverse of the moduli.

19. The method of claim 17, wherein:
the first-level FPGA communicates with each of the second-level FPGAs using an inter-FPGA communication protocol;
each of the second-level FPGAs communicate with one or more of the plurality of third-level FPGAs using the inter-FPGA communication protocol; and
each of the third-level FPGAs communicate with the fourth-level FPGA using the inter-FPGA communication protocol.

20. The method of claim 17, wherein the ciphertext polynomial vector is received from a computing device over a PCIe interface and wherein the constant-term polynomial vector and the linear-term polynomial vector are output to the computing device over the PCIe interface.

* * * * *